(12) United States Patent
Dunn et al.

(10) Patent No.: US 7,600,166 B1
(45) Date of Patent: Oct. 6, 2009

(54) METHOD AND SYSTEM FOR PROVIDING TRUSTED ACCESS TO A JTAG SCAN INTERFACE IN A MICROPROCESSOR

(76) Inventors: David Dunn, 4525 191st Pl. NE., Sammamish, WA (US) 98074; Keith Klayman, 1761 Dornie Cir., Folsom, CA (US) 95630

( * ) Notice: Subject to any disclaimer, the term of this patent is extended or adjusted under 35 U.S.C. 154(b) by 746 days.

(21) Appl. No.: 11/169,403

(22) Filed: Jun. 28, 2005

(51) Int. Cl.
*G01R 31/28* (2006.01)
(52) U.S. Cl. ...................................... 714/726
(58) Field of Classification Search ................. 714/726
See application file for complete search history.

(56) References Cited

U.S. PATENT DOCUMENTS

| | | | |
|---|---|---|---|
| 6,968,420 B1 | 11/2005 | Giles et al. | |
| 7,080,789 B2 * | 7/2006 | Leaming | 235/492 |
| 7,117,352 B1 * | 10/2006 | Giles et al. | 713/2 |
| 2003/0204801 A1 * | 10/2003 | Tkacik et al. | 714/726 |
| 2003/0206627 A1 | 11/2003 | Penugonda et al. | |
| 2005/0066189 A1 | 3/2005 | Moss et al. | |
| 2006/0282734 A1 * | 12/2006 | Milne et al. | 714/742 |

FOREIGN PATENT DOCUMENTS

JP 20022228716 8/2002

OTHER PUBLICATIONS

Notice of Allowance, Mail Date May 02, 2007; U.S. Appl. No. 11/241,104.
Notice of Allowance, Mail Date Aug. 31, 2007; U.S. Appl. No. 11/241,104.
Notice of Allowance, Mail Date 12-04-207; U.S. Appl. No. 11/241,104.
Non Final Office Action, Mail Date Feb. 09, 2007; U.S. Appl. No. 11/241,104.
Notice of Allowance, Mail Date Apr. 21, 2009; U.S. Appl. No. 12/033,864.
Final Rejection (Office Action), Mail Date Jan. 29, 2008; U.S. Appl. No. 12/033,864.
Non Final Office Action, Mail Date Sep. 19, 2008; U.S. Appl. No. 12/033,864.
International Search Report, Mail Date Mar. 12, 2007; International Application No. PCT/US2006/038168; International Filing Date Sep. 28, 2006.
PCT Written Opinion of the International Searching Authority; Mail Date Mar. 12, 2007; International Application No. PCT/US2006/038168; International Filing Date Sep. 28, 2006.

* cited by examiner

*Primary Examiner*—James C Kerveros

(57) ABSTRACT

A method for securing a scan chain architecture by performing an authentication operation through a trusted software layer to authorize use of a protected scan chain.

27 Claims, 7 Drawing Sheets

METHOD AND SYSTEM FOR PROVIDING TRUSTED ACCESS TO A JTAG SCAN INTERFACE IN A MICROPROCESSOR

TECHNICAL FIELD

Embodiments of the present invention relate to the field of digital computer systems. More particularly, embodiments of the present invention relate generally to securing JTAG scan interfaces.

BACKGROUND ART

Many processors support interfaces intended for debugging, profiling, or aiding the manufacturing process of a chip as it is tested during pre-packaging and after packaging. These support interfaces allow access to internal states of the chip. For example, this includes support for post-shipment chip return failure analysis. Such access is open and frequently implemented via a low pin count interface to the CPU, such as a scan chain interface. However, when a processor contains processor specific secrets, or is requested to perform sensitive (secure and trusted) operations, these support interfaces put these secrets at risk of discovery. That is, preservation of sensitive information can be compromised due to unfettered access to the processors and memory of each of the conventional digital computer systems through these support interfaces. Thus, it would be advantageous to provide a solution that can provide a secure scan chain interface.

DISCLOSURE OF THE INVENTION

Embodiments of the present invention provide a method and system for securing a scan chain architecture by performing an authentication operation through a trusted software layer to authorize use of a protected JTAG scan interface.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODES FOR CARRYING OUT THE INVENTION

Figure 1:
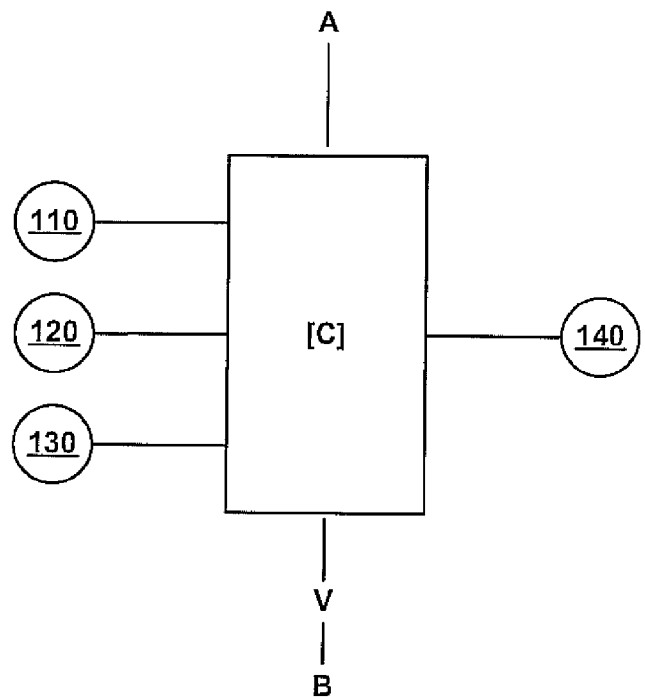
FIG. 1 is a diagram of a scan element that implements a scan chain for a JTAG scan interface, in accordance with one embodiment of the present invention.

Reference will now be made in detail to the preferred embodiments of the present invention, a method and system for securing a scan chain architecture by performing an authentication operation through a secure software layer to authorize use of a JTAG scan interface, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Embodiments of the present invention can be implemented on software running on a computer system. The computer system can be a personal computer, notebook computer, server computer, mainframe, networked computer, handheld computer, personal digital assistant, workstation, and the like. This software program is operable for securing a scan chain architecture by performing an authentication operation through a software layer to authorize use of a JTAG scan interface. In one embodiment, the computer system includes a processor coupled to a bus and memory storage coupled to the bus. The memory storage can be volatile or non-volatile and can include removable storage media. The computer can also include a display, provision for data input and output, etc.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "disabling," "enabling," "receiving," "verifying," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, embodiments of the present invention provide a method and system for securing a scan chain architecture by performing an authentication operation through a trusted software layer to authorize use of a JTAG scan interface. Embodiments of the present invention and their benefits are further described below.

Scan Chain Introduction

Embodiments of the present invention implement a scan chain for a low pin count interface, such as a Joint Test Action Group (JTAG) scan interface. For example, in one embodiment, the JTAG scan interface is a boundary scan chain. In another embodiment, the JTAG scan interface is a Direct Memory Test Access (DMTA) scan chain. In still another embodiment, the JTAG scan interface is a flash chain that provides a serial interface to the flash read only memory (ROM). While embodiments of the present invention are discussed within the context of JTAG scan interfaces, other embodiments are well suited to securing any type of scan chain interface into an integrated circuit.

FIG. 1 is a diagram of a scan element 100 that implements a scan chain for a JTAG scan interface. The JTAG scan interface tests the internal states of an integrated circuit, in one embodiment. For example, boundary scan elements in an integrated circuit can capture data from core pin or logic signals, or input data into the core pins or logic signals. Captured data is serially shifted out. In addition, input data is serially shifted into the boundary scan elements.

FIG. 1 provides a working definition of scan-chains (scalable, simple, IO chains). Such scan chains are standard logic implementations well known in the art. As shown in FIG. 1, the basic scan element 100 provides an interface to an internal logic storage elements, [A] and [B], embedded within a larger system (e.g., integrated circuit). The scan element 100 also holds a logic (true=1 or false=0) state [C].

The scan element 100 is used for extracting state [A] from the integrated circuit. In addition, the scan element is used for inserting state [B] into the integrated circuit.

In one embodiment, during normal operation, the scan-clock signal 130 is externally held at zero. In this state, [B] is a direct mirror of the state of the scan element, [C]. That is, any target internal logic driven from [B] can be said to be driven by the scan logic state [C].

In one embodiment, for purposes of illustrating the edge triggered capture, the state of the scan logic [C] is mirrored into the out scan signal 140 on the rising edge of the scan-clock signal 130. Also, on the falling edge of the scan-clock signal 130, the state of [C] is loaded from either target internal state [A], or the in scan signal 120 depending on the state of the capture signal 110. That is, if the capture signal 110 is logic high on the falling edge of scan-clock, in one embodiment, then [C] is set from target internal state [A]. On the other hand, if the capture signal 110 is logic low on the falling-edge of the scan-clock signal 130, then [C] is set from the in signal 110.

Figure 2:
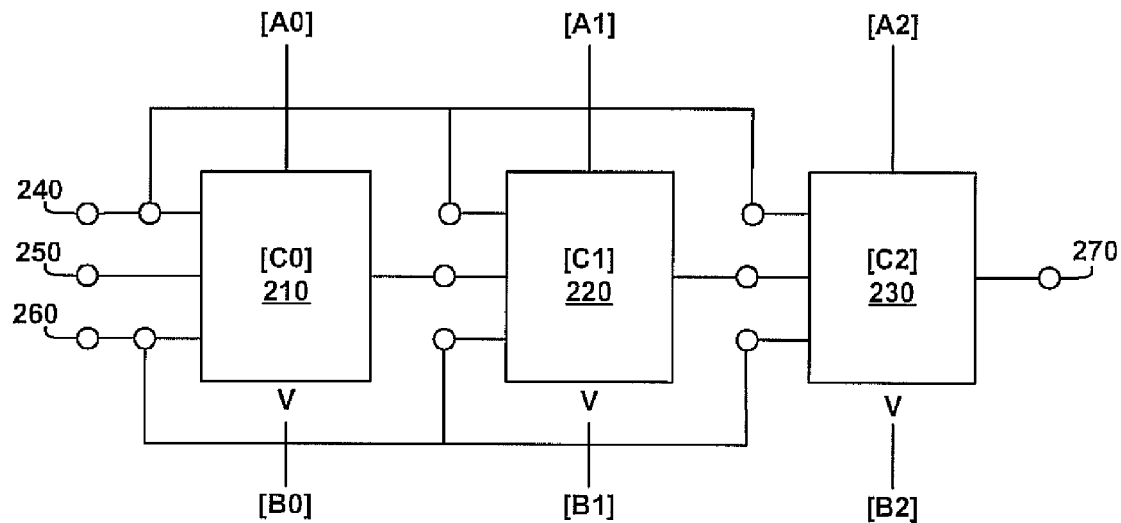
FIG. 2 is a diagram illustrating a scan chain of elements, in accordance with one embodiment of the present invention.

FIG. 2 is a diagram illustrating a scan chain 200 of elements, in accordance with one embodiment of the present invention. For instance, scan element 100 of FIG. 1 can be scaled by tying a number of scan-logic elements together, to create a scan-chain. In scan element 100, there are three scan elements shown, scan element 210, scan element 220, and scan element 230. In accordance with embodiments of the present invention, the scan chain 200 enables the setting and viewing of scan-chain states {Cn} through a serial (low pin count) interface, in one embodiment, where {Cn} has 'n' scan elements numbered 0 . . . (n−1).

To tie the scan elements 210, 220, and 230 together, the in pins for each of the scan elements is tied to an out pin from the preceding scan element. For instance the input signal for the scan element 220 is tied to the output signal to the scan element 210. Also, an input signal 250 and an output signal 270 is provided for the scan chain 200.

As shown in FIG. 2, the capture pins 240 for the scan elements in the scan chain 200 are wired together. In addition, the scan clock pin 260 for the scan elements in the scan chain 200 are wired together.

Figure 3:
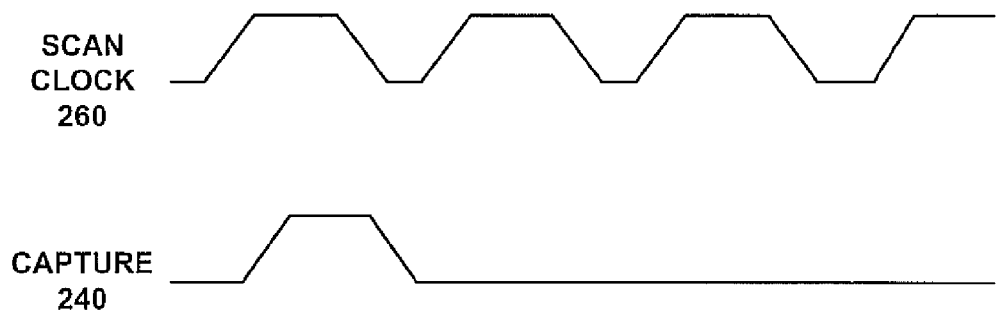
FIG. 3 is a timing diagram of the signals implemented within the scan chain of FIG. 2, in accordance with one embodiment of the present invention.

FIG. 3 is a timing diagram of the signals implemented within the scan chain 200 of FIG. 2, in accordance with one embodiment of the present invention.

As shown in FIG. 3, 1+n scan-clock cycles are required to view the internal target state {An} associated with the scan chain 200.

For example, in the case n=3 of FIG. 2, the scan-clock signal 260 is driven. In addition, the capture signal 240 is initially driven high to capture the internal states (e.g., A0, A1, and A2) of the scan elements in the scan chain 200 simultaneously. That is, instead of reading the signal from the input pin of each of the scan elements, on the falling edge of the scan clock signal 260, the internal state of the processor of each scan element (e.g., A0, A1, or A2) is taken.

Thereafter, the capture signal 240 is driven low so that the internal states will be serially driven out as an output signal 270. That is, if the capture signal 240 is asserted in a low state for the duration, each element {Cn} is set by scanning the internal state of the previous scan element through the chain of 'in' signals. As such, the internal states of the processor of each scan element (e.g., A0, A1, and A2) are serially clocked out.

Additionally, internal state [B] is also inputted into the scan chain through the same methodology, in another embodiment.

Method and System for Securing a Boundary Scan Test Interface Through a Trusted Software Layer Embodiments of the present invention are capable of authenticating access for a JTAG scan interface through a trusted software layer. As such, embodiments in accordance with the present invention are able to provide authenticated access to the JTAG scan interface with a minimal set of hardware and software components. That is, the smallest degree of support circuitry and software interfaces are used to perform a scan test through a JTAG scan interface. For example, in one embodiment, the JTAG scan interface is a boundary scan chain. In another embodiment, the JTAG scan interface is a DMTA scan chain. In still another embodiment, the JTAG scan interface is a flash chain that provides a serial interface to the flash ROM. This allows debugging of a processor even though core functionality of a processor is malfunctioning (e.g., north and south bridge interfaces, etc.). For example, an input/output (I/O) device for communicating with external peripherals is unnecessary for accessing the JTAG scan interface.

Figure 4:
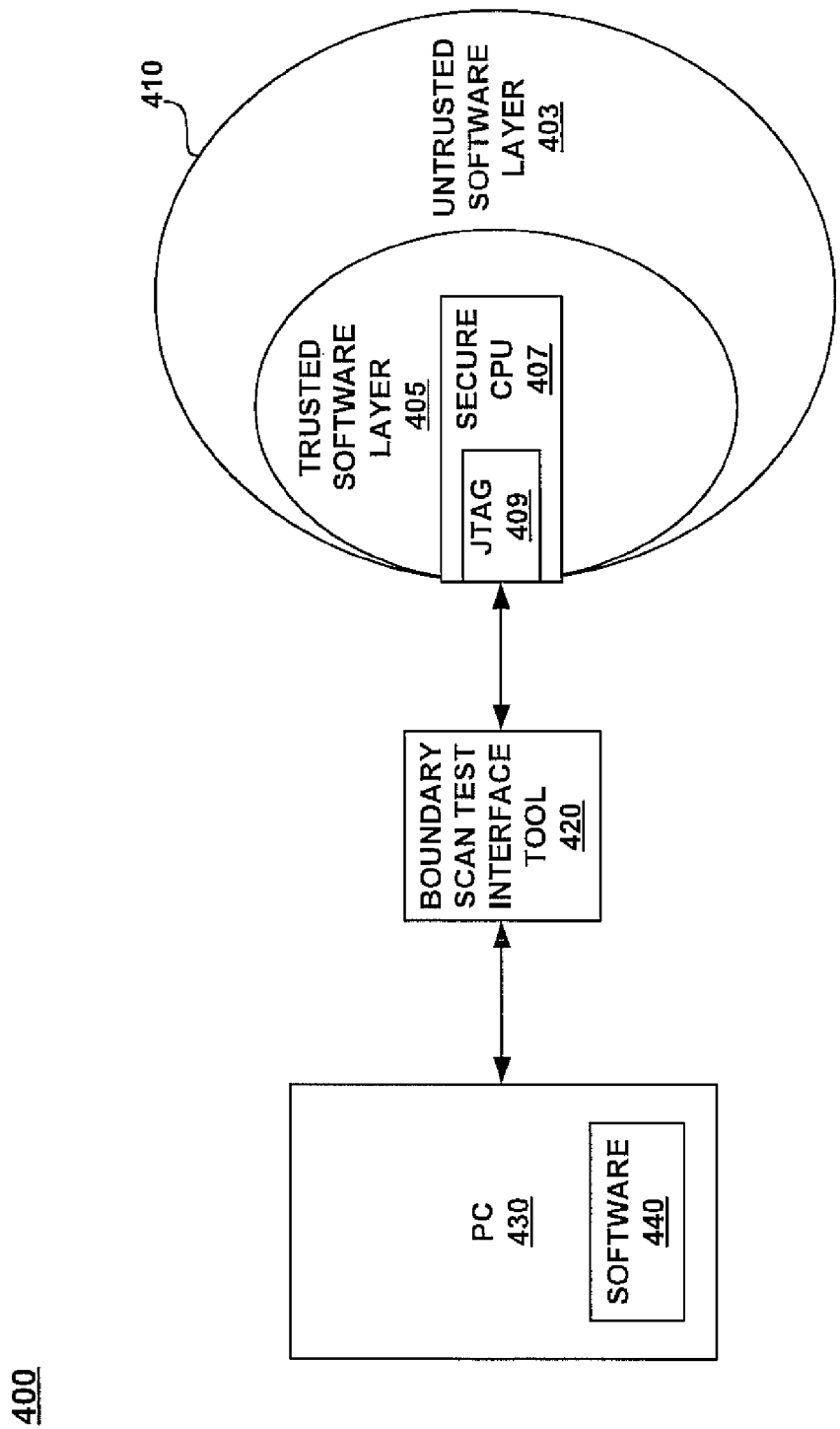
FIG. 4 is a block diagram of a system implementing a JTAG scan interface, in accordance with embodiments of the present invention.

FIG. 4 is a block diagram of a system that illustrates access to a JTAG scan interface for a general purpose processing architecture 410, in accordance with one embodiment of the present invention. Although the present embodiment is described within the context of a JTAG scan interface for purposes of brevity and clarity, it is not intended that the JTAG scan interface support only JTAG. That is, other embodiments of the present invention are well suited to supporting other forms of JTAG scan interfaces implementing scan functionality.

In FIG. 4, the general purpose processing architecture 410 is capable of providing protected scan functionality through an authentication procedure implemented through a trusted software layer 405. The processing architecture 410 includes a secure central processing unit (CPU), such as a microprocessor, a trusted software layer 405, and an untrusted software layer 403. In one embodiment, the secure CPU 407 is secure from outside encroachment, such as access through the untrusted software layer 403.

The secure CPU 407 provides for core processing functionality, in accordance with one embodiment of the present invention. The secure CPU is hard coded onto an integrated circuit (IC) chip. The secure CPU 407 includes internal registers, and caches, for example.

In one embodiment, in combination, the trusted software layer 405 and the secure CPU 407 provide for complete processing functionality in a processing environment. As such, the trusted software layer provides its own processing functionality that may or may not be duplicated by the secure CPU 407. For example, the trusted software layer is capable of operating to authenticate access to the JTAG scan interface 409.

In addition, in one embodiment, the trusted software layer 405 provides an interface for providing restricted remote access to the secure CPU 407, in one embodiment. That is, the secure CPU 407 is only accessible through the trusted software layer 405. The trusted software layer provides executable instructions which are sent to the secure CPU for processing. Because the trusted software layer 405 provides a filtering function, remote access to the secure CPU 407 is restricted. For instance, in one embodiment, all access to the secure CPU 407 must go through the trusted software layer 405.

More specifically, the trusted software layer 405 is capable of interfacing with permitted resources in the secure CPU 407 that the secure CPU 407 grants access. As such, the trusted software layer 405 has complete and total control over the hardware code and resources in the secure CPU 407 that the trusted software layer 405 has permission to access. In contrast, the untrusted software layer 403 does not have any access to the resources (e.g., internal registers, caches, etc.) of the secure CPU 407.

In addition, the JTAG scan interface 409 provides access to the internal state of the secure CPU 407 in a testing environment. Embodiments of the present invention are capable of securing this interface 409 to the internal state of the secure CPU 407 by allowing only authenticated access to the JTAG scan interface. Authentication is performed at the trusted software layer to minimize hardware and software resources required to support the boundary scan test.

The boundary scan test functionality is usually accessed via an industry standard scan test protocol (e.g., JTAG). Regardless of the scan test protocol used in embodiments of the present invention, a small set of physical pins provides access to the JTAG scan interface (e.g., C4s) that are dedicated to scan functionality. Activity on these pins is processed by a small amount of logic in the die of the secure CPU 407.

As shown in FIG. 4, a JTAG scan interface tool 420 along with a PC 430 is used to implement the boundary scan test functionality through the JTAG scan interface 409. That is, the PC 430 is communicatively coupled to the JTAG scan interface tool 420. The JTAG scan interface tool 420 is communicatively coupled to the JTAG scan test interface 409.

The JTAG scan interface tool 420 provides the scan logic for running the standardized scan protocol used to access the internal state of the secure CPU 407. The PC 430 along with installed software 440 provides the user interface with the JTAG scan interface tool 420 in order to access the internal state of the secure CPU 407. Implementation of the PC 430 with the JTAG scan interface tool 420 allows for debugging of the secure CPU 407, in one embodiment.

Figure 5:
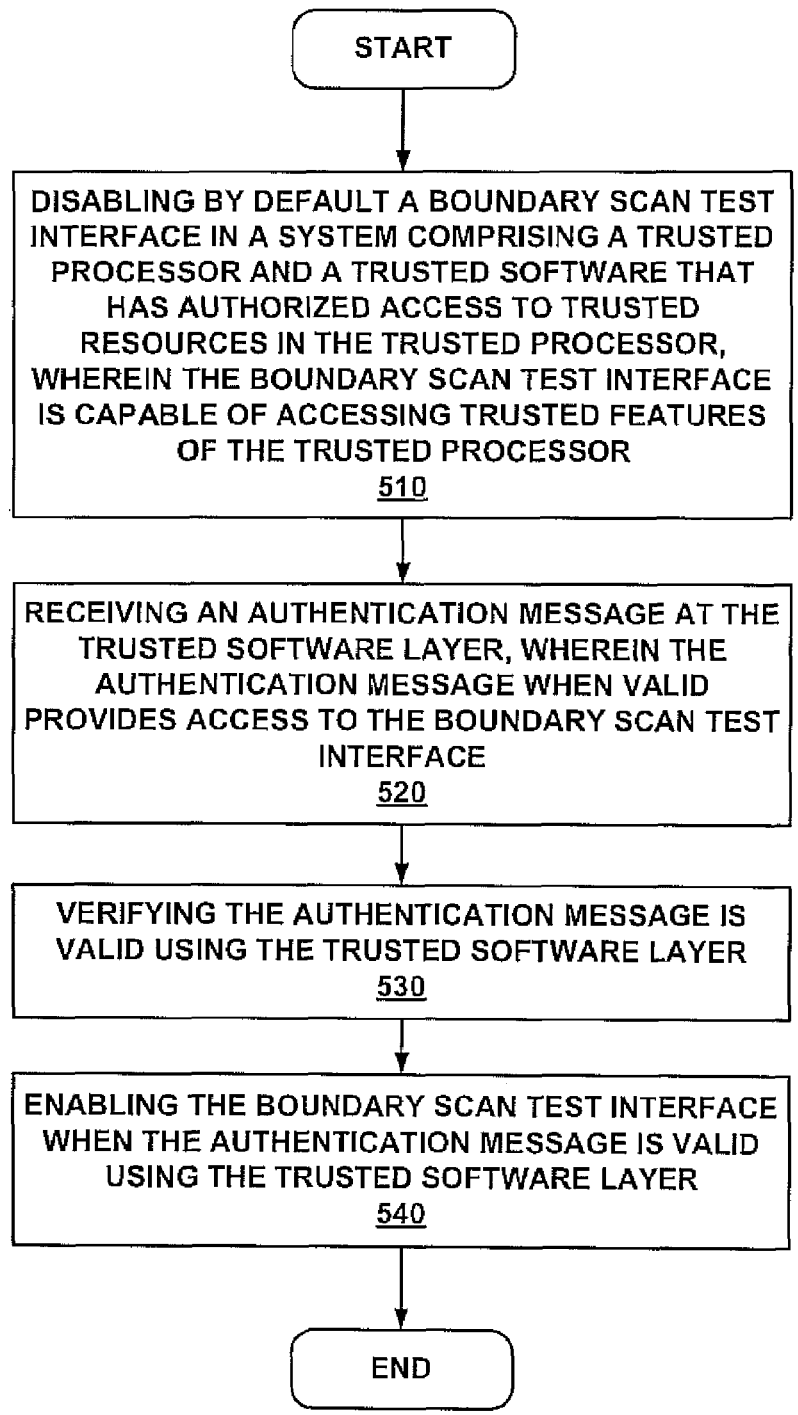
FIG. 5 is a flow diagram illustrating steps in a computer implemented method for securing a JTAG scan interface through a trusted software layer, in accordance with one embodiment of the present invention.

FIG. 5 is a flow diagram illustrating steps in a computer implemented method for securing a scan chain architecture, in accordance with one embodiment of the present invention. Embodiments in accordance with the present invention are capable of authenticating access to the scan chain architecture through a trusted software layer, and therefore require minimum support from hardware components of the processor, the object of the boundary scan test.

At 510, the present embodiment disables a JTAG scan interface in a system including a secure processor and a trusted software layer. The JTAG scan interface is capable of accessing trusted resources in the secure processor (e.g., CPU, microprocessor, etc.). More specifically, the JTAG scan interface is capable of performing scan functionality using standardized scan protocols (e.g., boundary, DMTA, flash ROM interface, etc.) for accessing the internal state of the CPU. For example, the JTAG scan interface is capable of accessing the internal state of registers and cache memory of the secure processor.

The present embodiment disables by default the JTAG scan interface. More specifically, the JTAG scan interface is placed into a disabled default mode upon booting up the system, in one embodiment. In another embodiment, the JTAG scan interface is placed into a disabled default mode when the system is reset. As such, the JTAG scan interface is disabled, thereby, preventing access the internal state of the secure processor.

The system includes a trusted software layer that interfaces with the secure processor. More specifically, the trusted software layer has authorized access to particular trusted resources in the secure processor. For example, the present embodiment utilizes the trusted software to access trusted resources in the secure processor to perform authentication operations and to control the JTAG scan interface by disabling or enabling the JTAG scan interface.

At 520, the present embodiment receives an authentication message at the trusted software layer. The authentication message is used to provide access to the JTAG scan interface. More specifically, when the authentication is valid, then access to the JTAG scan interface is authorized.

The present embodiment performs the authentication operations at the trusted software layer. That is, a minimum of required hardware components of the secure processor can support the authentication process. As such, the present embodiment is able to authenticate and perform the JTAG scan interface even though major components of the secure processor are malfunctioning.

At 530, the present embodiment verifies the authentication message is valid using the trusted software layer. In one particular embodiment, the authentication message is signed using a private key. The private key is part of an asymmetric key pair that also includes a public key. The public key is accessible by the trusted software layer. That is, the public key is stored internally within the secure processor and the trusted software layer is authorized access to the public key to perform the authentication operations.

In one embodiment, the asymmetric key pair exhibits a close relationship. In authentication operations, a message that is signed by one of the keys in the asymmetric key pair can only be authenticated using the other key in the asymmetric key pair. As such, the present embodiment uses the public key in the asymmetric key pair to verify a signature of the authentication message.

More specifically, in the present embodiment the authentication message is signed with the private key. This authentication message is used as a password to provide access to the JTAG scan interface. The trusted software layer verifies the signed authentication message. That is, the present embodiment verifies the signature of the authentication message. For example, the present embodiment runs a hash algorithm on the authentication message using the public key to reproduce a signature of the authentication message. If the signature produces using the public key is identical to the signature using the private key, then the authentication is valid and verified. More specifically, the present embodiment is able to verify that the authentication message used to provide access to the JTAG scan interface comes from an expected and reliable source. As such, the authentication message is valid and can be used to provide authorized access to the JTAG scan interface.

In another embodiment, a further operation is performed to determine the validity of the authentication message. Specifically, the trusted software layer compares the format of the authentication message received to an expected format. For example, the expected format might be "Processor X, enable JTAG scan interface." If the authentication message is in a different format, then the authentication message is invalid, even though it may be signed properly with the private key.

In still another embodiment, the authentication message is encrypted. That is, the authentication message can be encrypted using the private key of the asymmetric key pair. As such, the trusted software layer must decrypt the authentication message using the public key of the asymmetric key pair. The public key of the asymmetric key pair is the only key that can decrypt the authentication message. For instance, in one embodiment, the trusted software layer is capable of performing triple DES in a number of modes (ECB, CBC, etc.) for purposes of decrypting the authentication message. While the present embodiment implements triple DES cryptography mechanism, other embodiments are well suited to using other cryptography mechanisms, such as, AES.

At 540, the present embodiment enables the JTAG scan interface when the authentication message is valid using said trusted software layer. That is, once the authentication message is verified, the present embodiment can trust whomever wants access to the JTAG scan interface.

In one embodiment, control over the JTAG scan interface is through a control bit. The control bit is located within the secure processor, and is stored in a secure register, for example. More specifically, when the control bit is in a first state (e.g., low) the JTAG scan interface is disabled. On the other hand, when the control bit is in a second state (e.g., high) the JTAG scan interface is enabled.

As such, to disable the JTAG scan interface, the present embodiment sets the internal register to the first state. Correspondingly, the present embodiment enables the JTAG scan interface by setting the internal register to the second state.

Figure 6:
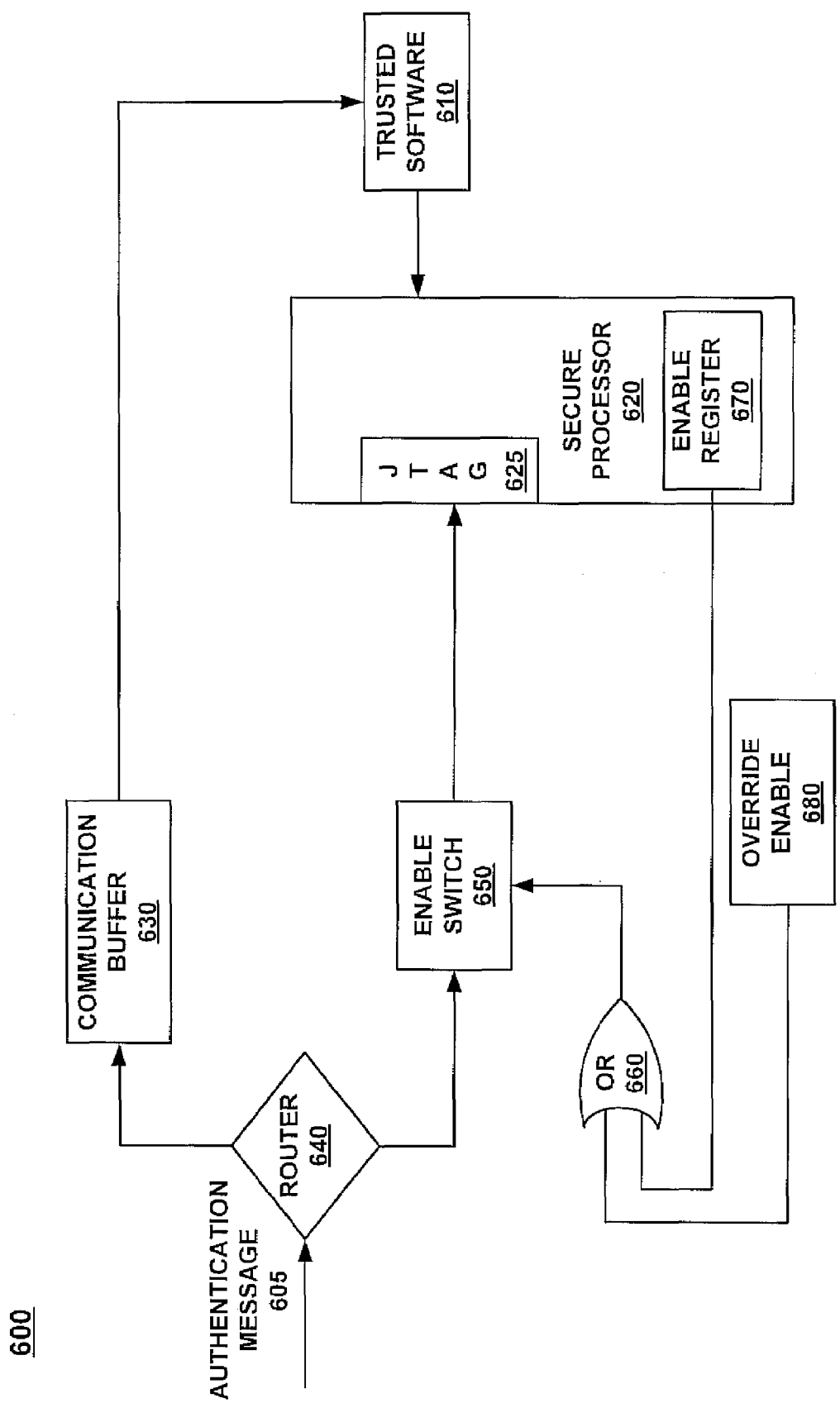
FIG. 6 is a block diagram of a system that is capable of securing a JTAG scan interface through a trusted software layer, in accordance with one embodiment of the present invention.

Turning now to FIG. 6, a system 600 is shown that is capable of securing a scan chain architecture through a trusted software layer, in accordance with one embodiment of the present invention. Embodiments in accordance with the present invention are capable of authenticating access to the JTAG scan interface through a trusted software layer, and therefore require minimum support from hardware components of the processor.

The system 600 includes a secure processor 620. The secure processor is the object of the scan chain. That is, the internal state of the processor is discoverable by performing scan chain operations.

In one embodiment, the scan chain operations are implemented through a JTAG scan interface 625 that is coupled to the secure processor. As such, the JTAG scan interface is capable of accessing secure features (e.g., internal state) of the secure processor 620. For example, the JTAG scan interface 625 can access the internal state of the secure processor 620.

The system of the present embodiment also includes trusted software 610 that is communicatively coupled to the secure processor 620. The trusted software is used for validating an authentication message 605. The authentication message 605 is used to provide access to the JTAG scan interface 625 when verified. In addition, the trusted software 610 has authorized access to trusted resources in the secure processor in order to perform the authentication operations.

The system 600 of the present embodiment also includes a communication buffer 630 for receiving the authentication message 605. The communication buffer is communicatively coupled to a router 640. The router receives the authentication message 605 as an input and routs the authentication message 605 to the communication buffer 630 for authentication purposes. In addition, the router provides external access to the JTAG scan interface 625 when the enable switch 650 is properly configured.

In addition, the communication buffer 630 is also communicatively coupled to the trusted software 610 through an authentication link 607 in one embodiment. The authentication link communicatively couples said communication buffer 630 directly to the trusted software 610 for authentication purposes. More specifically, the communication buffer 630 provides external access to the trusted software 610. That is, the communication buffer provides an interface to the trusted software 610 for authentication purposes. As such, the authentication message 605 that is stored in the communication buffer 630 is accessible by the trusted software in order to provide access to the JTAG scan interface 625.

For instance, as soon as the communication buffer stores the authentication message 605, the trusted software is alerted. The trusted software 610 then accesses the authentication message 605 stored in the communication buffer 630 in order to perform authentication operations to verify access to the JTAG scan interface 625.

In addition, the system 600 also includes an enable register 670. The enable register is internal to the secure processor 620 and is secure from outside access. That is, the trusted software 610 and the secure processor 620 are only able to access the enable register 670. The enable register 670 controls the JTAG scan interface 625 when properly set. For instance, when the enable register is in a first state (e.g., low) the JTAG scan interface 625 is disabled. On the other hand, if the enable register 670 is in a second state (e.g., high) the JTAG scan interface 625 is enabled.

As such, to disable the JTAG scan interface 620, the present embodiment sets the internal register 670 to the first state. Correspondingly, the present embodiment through the trusted software 610 enables the JTAG scan interface 625 by setting the internal register 670 to the second state when the authentication message 605 is valid.

Previously, a discussion of the authentication operations performed to validate the authentication message 605 was presented in conjunction with the discussion of FIG. 5. For example, the trusted software 610 uses a public key in an asymmetric key pair to validate a signature of the authentication message 605. The authentication message 605 is signed by a private key from the asymmetric key pair.

In one embodiment, the enable register 670 is disabled by default. That is, when bootstrapping the secure processor 620, the enable register 670 is placed in the first state to disable the JTAG scan interface.

The system 600 also includes an enable switch 650. The enable switch 650 controls access to the JTAG scan interface 625. When the switch is engaged, the JTAG scan interface 625 is enabled and external access is provided to the JTAG scan interface. When the switch 650 is not engaged, the JTAG scan interface 625 is disabled excluding external access. As such, the JTAG scan interface 625 is controlled by the enable switch 650 when properly signaled by either the enable register 670 or the override enable 680.

The enable switch is communicatively coupled to both the enable register 670 and an override enable 680 through a logic OR gate 660, in one embodiment. That is, the logic OR gate 660 is communicatively coupled to the enable register 670 and the override enable 680 and performs a logic OR operation on the two inputs. An output to the logic OR gate is communicatively coupled to the enable switch 650. If either the enable register 670 or the override enable 680 sends the proper signal to the enable switch, external access is provided to the JTAG scan interface 625. That is, the switch 650 communicatively links the router 640 to the JTAG scan interface 625 when the enable switch 650 is turned on or engaged.

The system 600 includes an override enable 680. The override enable 680 is communicatively coupled to the JTAG scan interface, as previously described. The override enable 680 enables the JTAG scan interface when properly signaled. For instance, the override enable 680 is a pin (e.g., C4) in one embodiment. When the override enable pin 680 is tied to the proper signal (e.g., ground, power, float), the JTAG scan interface 625 is enabled. When the override enable pin 680 is not tied to the proper signal, the JTAG scan interface 625 is disabled. That is, the override enable 680 provides the proper signal thought the logic OR gate 660 to enable the enable switch 650, which communicatively couples the router 640 to the JTAG scan interface 625. The override enable 680 is used during the manufacturing process of the individual die including the secure processor 620. As such, debugging operations can be performed on the die during manufacturing before packaging the die on a board. In addition, the override enable 600 is disabled after the manufacturing process and hidden from access during the packaging process.

Figure 7:
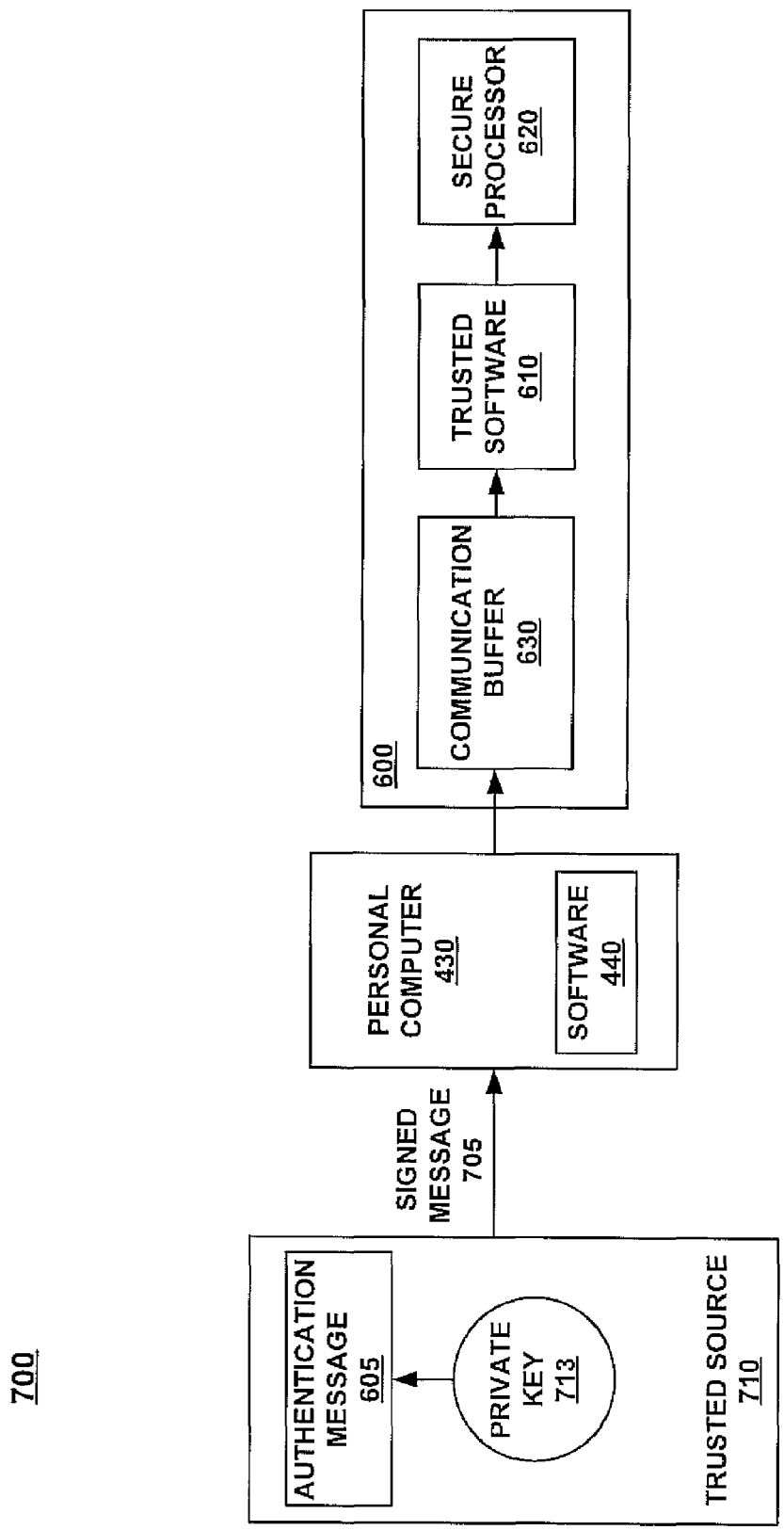
FIG. 7 is a data flow diagram illustrating the flow of information for authenticating access to a JTAG scan interface, in accordance with one embodiment of the present invention.

FIG. 7 is a data flow diagram 700 illustrating the flow of information when authorizing access to a JTAG scan interface, in accordance with one embodiment of the present invention. The present embodiment illustrates the challenge process implemented to gain access to the JTAG scan interface through a trusted software layer.

As described previously, the JTAG scan interface provides access to the internal state of a secure processor 620. The system 600 of FIG. 6 includes the communication buffer 630, the trusted software 610 and the secure processor 620, as previously described.

In the challenge process, an authentication message 605 is presented to authenticate the holder of the authentication message in order to gain access to the JTAG scan interface.

As shown in FIG. 7, the authentication message 605 is generated at a trusted source 710. The authentication message is signed using a private key 713 thereby generating a signed message 705. The private key is part of an asymmetric key pair, as previously described. That is, the private key can verify a document signed by the public key, and the public key can verify a document signed by the private key. In addition, the private key 713 is held securely by the trusted source 710.

For example, the trusted source will generate the authentication message and sign the message for a user that is authorized access to the system 600 through a JTAG scan interface. As an example, the authentication message may state the following: "Enable JTAG scan interface for Processor X," where X is a processor identifier (e.g., serial number, or version number). This authorization process is performed externally to the system 600. That is, the trusted source 710 will only generate the signed message for a user that the trusted source has verified can gain access to the JTAG scan interface of system 600.

In one embodiment, the authentication message is unique to each individual processor. This is to provide further security to the JTAG scan interface. As such, the unique authentication message only authorizes access to the JTAG scan interface for the associated processor. For instance, the authentication message 605 may use the processor ID (e.g., serial number) as the processor identifier, X. The authentication message will not authorize access to other processors.

In another embodiment, the authentication message is unique to a version of a processor. That is, the authentication message will authorize access to a plurality of identical processors of the same version. For instance, the authentication message 605 may use the version number as the processor identifier, X. An associated symmetric private/public key pair is necessary to authenticate the message, in accordance with embodiments of the present invention.

In still other embodiments, variations of the uniqueness of the authentication message are possible. In one embodiment, the same version of a processor has two or more unique authentication messages that provide access to associated JTAG scan interfaces. For instance, the first ten-thousand processors having the same model and version type has a first authentication message with an associated asymmetric key pair used for authentication purposes access JTAG scan interfaces. The next ten-thousand processor having identical model and version types has a second authentication message with another associated asymmetric key pair that is used for authentication purposes to access the JTAG scan interface.

In the present embodiment, the signed message 705 is delivered to the user to provide access to the JTAG scan interface associated with system 600. For security measures, the signed message 705 is provided on a portable media (e.g., compact disc) and hand delivered or mailed to the user, in one embodiment. In another embodiment, the signed message 705 is delivered electronically through a secure line (e.g., secure socket layer) to the user. In still other embodiments, other secure communication means are implemented to deliver the signed message 705.

As shown in FIG. 7, the signed message is provided as input by the user to the PC 430 that interfaces with the system 600 in order to authenticate access to the JTAG scan interface of system 600. That is, the PC 430 uses the software 440 to interface with the system 600 in the authentication process.

More specifically, the signed message 705 is provided as an input by the PC 430 to the communication buffer 630 of system 600. As previously described, the communication buffer 630 provides direct access to the trusted software 610 for authentication purposes.

The trusted software 610 verifies the authentication message 605. More specifically, the trusted software 610 verifies the signature of the signed message 705. The verification of the signature was described previously in conjunction with the discussion of FIG. 5.

After the trusted software 610 has verified the signed message 705, the trusted software 610 directs the secure processor 620 to enable the JTAG scan interface. For example, one embodiment directs the trusted software to enable the JTAG scan interface by setting a register internal to the secure processor 620 to a first state (e.g., high). When the register is in the first state, the JTAG scan interface is enabled and provides access to the internal state of the secure processor.

As a result, embodiments in accordance with present invention are able to provide authentication through a trusted software layer in order to provide secure access to JTAG scan interface.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Embodiments of the present invention, a method and system for securing a scan chain architecture by performing an authentication operation at a trusted software layer are described. While the present invention has been described in particular embodiments, it should be appreciated that the present invention should not be construed as limited by such embodiments, but rather construed according to the below claims

What is claimed is:

1. A method for securing a scan chain architecture, comprising:
    disabling by default a JTAG scan interface in a system comprising a secure processor and a trusted software layer that has authorized access to trusted resources in said secure processor, wherein said JTAG scan interface is capable of accessing trusted features of said secure processor;
    receiving an authentication message at the trusted software layer, wherein said authentication message when valid provides access to said JTAG scan interface;
    verifying said authentication message is valid using said trusted software layer; and
    enabling said JTAG scan interface when said authentication message is valid using said trusted software layer.

2. The method of claim 1 wherein said disabling by default further comprises:
    disabling said JTAG scan interface upon booting up said secure processor.

3. The method of claim 1, wherein said disabling by default further comprises:
    setting a register to a first state that disables said JTAG scan interface, wherein said register is internal to said secure processor.

4. The method of claim 3, wherein said enabling said JTAG scan interface further comprises:
    setting said register to a second state that enables said JTAG scan interface.

5. The method of claim 1, wherein said receiving said authentication message further comprises:
    receiving said authentication message through a communication buffer that provides an interface to said trusted software layer for authentication purposes.

6. The method of claim 1, wherein said verifying said authentication message further comprises:
    verifying said authentication message is in a proper format.

7. The method of claim 1, wherein said verifying said authentication message further comprises:
    using a public key in an asymmetric key pair to verify a signature of said authentication message, wherein said authentication message is signed by a private key from said asymmetric key pair.

8. The method of claim 1, wherein said authentication message is encrypted.

9. The method of claim 1, wherein said verifying said authentication message further comprises:
    verifying a password.

10. The method of claim 1, further comprising:
    providing an override enable pin that controls said JTAG scan interface.

11. A system for securing a scan chain architecture, comprising:
    a secure processor;
    a JTAG scan interface coupled to said secure processor that is capable of accessing secure features of said secure processor;
    a trusted software communicatively coupled to said secure processor for validating an authentication message, wherein said trusted software has authorized access to trusted resources in said secure processor;
    a communication buffer for receiving said authentication message, herein said communication buffer provides an interface to said trusted software for authentication purposes;
    an authentication link that communicatively couples said communication buffer directly to said trusted software for authentication purposes; and
    a register internal to said secure processor for enabling said JTAG scan interface when properly set, wherein said trusted software enables said register when said authentication message is valid.

12. The system of claim 11, further comprising a router for routing said authentication message to said communication buffer.

13. The system of claim 11, wherein said JTAG scan interface is disabled by default upon bootstrapping said secure processor.

14. The system of claim 11, wherein said trusted software uses a public key in an asymmetric key pair to validate a signature of said authentication message, wherein said authentication message is signed by a private key from said asymmetric key pair.

15. The system of claim 11, wherein said trusted software decrypts said authentication message that is encrypted by a public key in an asymmetric key pair, said system performing encryption using a private key.

16. The system of claim 11, further comprising:
    an enable switch coupled to said register for controlling access to said JTAG scan interface.

17. The system of claim 16, further comprising:
    an override enable pin communicatively coupled to said JTAG scan interface, wherein said override enable pin enables said JTAG scan interface when properly signaled; and
    an OR logic gate coupled to said enable register and to said override enable pin through inputs and to said enable switch through an output.

18. A computer system comprising:
    a processor for processing information; and
    a computer readable memory coupled to said processor and containing program instructions that, when executed cause said processor to implement a method for securing a scan chain architecture, comprising:

disabling by default a JTAG scan interface in a system comprising a secure processor and a trusted software layer that has authorized access to trusted resources in said secure processor, wherein said JTAG scan interface is capable of accessing trusted features of said secure processor;

receiving an authentication message at the trusted software layer, wherein said authentication message when valid provides access to said JTAG scan interface;

verifying said authentication message is valid using said trusted software layer; and enabling said JTAG scan interface when said authentication message is valid using said trusted software layer.

19. The method of claim 18, wherein said disabling by default further comprises:
disabling said JTAG scan interface upon booting up said secure processor.

20. The method of claim 18, wherein said disabling by default further comprises:
setting a register to a first state that disables said JTAG scan interface, wherein said register is internal to said secure processor.

21. The method of claim 20, wherein said enabling said JTAG scan interface further comprises:
setting said register to a second state that enables said JTAG scan interface.

22. The method of claim 18, wherein said receiving said authentication message further comprises:
receiving said authentication message through a communication buffer that provides an interface to said trusted software layer for authentication purposes.

23. The method of claim 18, wherein said verifying said authentication message further comprises:
verifying said authentication message is in a proper format.

24. The method of claim 18, wherein said verifying said authentication message further comprises:
using a public key in an asymmetric key pair to verify a signature of said authentication message, wherein said authentication message is signed by a private key from said asymmetric key pair.

25. The method of claim 18, wherein said authentication message is encrypted.

26. The method of claim 18, wherein said verifying said authentication message further comprises:
verifying a password.

27. The method of claim 18, further comprising:
providing an override enable pin that controls said JTAG scan interface.

* * * * *

UNITED STATES PATENT AND TRADEMARK OFFICE
CERTIFICATE OF CORRECTION

PATENT NO. : 7,600,166 B1
APPLICATION NO. : 11/169403
DATED : October 6, 2009
INVENTOR(S) : Dunn et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 924 days.

Signed and Sealed this

Fifth Day of October, 2010

David J. Kappos
*Director of the United States Patent and Trademark Office*